US012227181B2

(12) United States Patent
Poulin et al.

(10) Patent No.: US 12,227,181 B2
(45) Date of Patent: Feb. 18, 2025

(54) SIMULATING BRAKING WHEN SPEEDING ON CRUISE CONTROL TO FACILITATE USE OF ISA SYSTEM

(71) Applicant: 7980302 Canada Inc., Montreal (CA)

(72) Inventors: Jean Poulin, Varennes (CA); George Bassily, Laval (CA); Mathieu Boivin, Mount Royal (CA); Gabriel Paquin Lefebvre, Montreal (CA)

(73) Assignee: 7980302 Canada Inc., Montreal (CA)

( * ) Notice: Subject to any disclaimer, the term of this patent is extended or adjusted under 35 U.S.C. 154(b) by 92 days.

(21) Appl. No.: 16/947,456

(22) Filed: Aug. 3, 2020

(65) Prior Publication Data

US 2021/0031765 A1 Feb. 4, 2021

Related U.S. Application Data

(60) Provisional application No. 62/881,934, filed on Aug. 1, 2019.

(51) Int. Cl.
*B60W 30/14* (2006.01)
*B60W 10/18* (2012.01)

(52) U.S. Cl.
CPC .......... *B60W 30/146* (2013.01); *B60W 10/18* (2013.01); *B60W 2510/18* (2013.01); *B60W 2520/10* (2013.01)

(58) Field of Classification Search
CPC ............... B60W 30/146; B60W 10/18; B60W 2510/18; B60W 2520/10; B60W 30/143;

(Continued)

(56) References Cited

U.S. PATENT DOCUMENTS 4,947,953 A * 8/1990 Morimoto ........... B60W 10/107
701/53
5,031,716 A 7/1991 Feldmann et al.
(Continued)

FOREIGN PATENT DOCUMENTS

CA 2610548 5/2015
CA 2768484 6/2019
(Continued)

OTHER PUBLICATIONS

Machine translation of JP 60163735 A retrieved from JPlatPat on Jun. 30, 2022 (Year: 2022) (Year: 2022).*

(Continued)

*Primary Examiner* — Thomas Ingram
*Assistant Examiner* — Faris Asim Shaikh
(74) *Attorney, Agent, or Firm* — TILLMAN WRIGHT, PLLC; Chad D. Tillman; James D. Wright (57) ABSTRACT

A controller causes a signal to be received by a main control module (MCM) in a controller area network of a vehicle when the vehicle is determined to be speeding or when a set speed of a cruise control would result in speeding. The signal indicates to the MCM that a driver of the vehicle is braking. The signal is caused to be received by the MCM when the vehicle is determined to be speeding regardless of whether the driver of the vehicle is actually braking, whereby cruise control that is engaged is disengaged by the MCM. Such controller is utilized in conjunction with ADA systems, especially ISA systems, for enabling such systems to properly function without specific regard to the particular manufacturer and model of the cruise control module that may be used in a given vehicle.

18 Claims, 9 Drawing Sheets

(58) Field of Classification Search
CPC ........... B60W 30/182; B60W 2555/60; B60W 30/1819; B60W 30/14; B60W 2556/50; H01H 1/0036; H01H 1/58
See application file for complete search history.

(56) References Cited

U.S. PATENT DOCUMENTS

| | | | |
|---|---|---|---|
| 5,774,820 | A | 6/1998 | Linden |
| 6,749,269 | B1 | 6/2004 | Niwa |
| 6,778,074 | B1 | 8/2004 | Cuozzo |
| 7,184,873 | B1 | 2/2007 | Idsinga et al. |
| 7,272,469 | B2 | 9/2007 | Kalau |
| 7,457,693 | B2 | 11/2008 | Olsen et al. |
| 7,706,953 | B1* | 4/2010 | Sun ................ B60W 30/143 340/441 |
| 7,957,882 | B2 | 6/2011 | Morisset |
| 8,000,877 | B2 | 8/2011 | Aussillou |
| 8,204,646 | B2 | 6/2012 | Morisset |
| 8,290,680 | B2 | 10/2012 | Morisset |
| 8,330,620 | B2 | 12/2012 | Swoboda et al. |
| 8,751,133 | B2* | 6/2014 | Poulin ............. B60W 30/146 700/304 |
| 9,240,018 | B2 | 1/2016 | Ricci |
| 9,396,656 | B2 | 7/2016 | Cazanas et al. |
| 9,630,590 | B2 | 4/2017 | Doherty et al. |
| 9,932,038 | B1 | 4/2018 | Zhu |
| 9,971,348 | B1 | 5/2018 | Canavor et al. |
| 10,373,257 | B1 | 8/2019 | Iqbal et al. |
| 10,388,161 | B2 | 8/2019 | Troutman et al. |
| 10,392,023 | B2 | 8/2019 | Maskell et al. |
| 10,479,200 | B2 | 11/2019 | Morisset |
| 10,593,205 | B1 | 3/2020 | Jones |
| 10,940,862 | B1* | 3/2021 | Dempsey ........ B60W 30/18136 |
| 11,407,420 | B2* | 8/2022 | Kubo ............... B60W 50/14 |
| 11,572,067 | B2 | 2/2023 | Poulin |
| 11,945,449 | B2 | 4/2024 | Lefebvre et al. |
| 2001/0003808 | A1 | 6/2001 | Jeon |
| 2001/0047236 | A1* | 11/2001 | Iriyama ............. F02D 11/107 701/97 |
| 2002/0040842 | A1* | 4/2002 | Arndt ................ B60T 7/107 200/61.12 |
| 2002/0065599 | A1 | 5/2002 | Hameleers et al. |
| 2002/0190854 | A1* | 12/2002 | Swan ................ B60Q 1/444 340/467 |
| 2003/0130783 | A1* | 7/2003 | Hellmann ......... B60W 30/16 701/93 |
| 2004/0212506 | A1 | 10/2004 | Cherouny et al. |
| 2005/0075829 | A1* | 4/2005 | Polimadei ............ G07C 5/00 702/165 |
| 2005/0146208 | A1 | 12/2005 | Wattenburg et al. |
| 2006/0081697 | A1 | 4/2006 | Brinton et al. |
| 2006/0095190 | A1* | 5/2006 | Currie ............... B60W 30/14 701/79 |
| 2007/0001830 | A1* | 1/2007 | Dagci ............... B60K 31/185 340/438 |
| 2007/0168125 | A1 | 7/2007 | Petrik |
| 2008/0091309 | A1* | 4/2008 | Walker ............ F02D 41/021 701/1 |
| 2008/0270519 | A1 | 10/2008 | Ekdahl et al. |
| 2010/0045451 | A1* | 2/2010 | Periwal ............... B60Q 9/00 340/439 |
| 2010/0280728 | A1* | 11/2010 | Labuhn ............. B60W 30/17 701/93 |
| 2011/0137520 | A1 | 6/2011 | Rector et al. |
| 2011/0160978 | A1 | 6/2011 | Yuzawa et al. |
| 2012/0215416 | A1* | 8/2012 | Poulin ............. B60W 30/146 701/93 |
| 2012/0226390 | A1 | 9/2012 | Adams et al. |
| 2012/0283928 | A1 | 11/2012 | Bjernetun et al. |
| 2012/0330522 | A1 | 12/2012 | Gibson et al. |
| 2013/0157647 | A1 | 6/2013 | Kolodziej |
| 2013/0164715 | A1 | 6/2013 | Hunt et al. |
| 2014/0046585 | A1 | 2/2014 | Morris, IV et al. |
| 2014/0282917 | A1 | 9/2014 | Peckover |
| 2015/0081399 | A1 | 3/2015 | Mitchell et al. |
| 2015/0120178 | A1 | 4/2015 | Kleve et al. |
| 2015/0246676 | A1 | 9/2015 | Keren |
| 2015/0336581 | A1 | 11/2015 | Slaton et al. |
| 2015/0355637 | A1 | 12/2015 | Morisset |
| 2016/0255575 | A1* | 9/2016 | Ricci ................ G06F 3/0488 370/329 |
| 2017/0068245 | A1 | 3/2017 | Scofield et al. |
| 2017/0129492 | A1* | 5/2017 | Follen ............. B60W 50/0097 |
| 2017/0282917 | A1* | 10/2017 | Pilutti ............... B60W 30/143 |
| 2017/0361840 | A1* | 12/2017 | Valentine ........... B60W 30/143 |
| 2018/0059687 | A1 | 3/2018 | Hayes et al. |
| 2018/0130095 | A1 | 5/2018 | Khoury |
| 2018/0210446 | A1 | 7/2018 | Canavor et al. |
| 2018/0308295 | A1 | 10/2018 | Kwak |
| 2018/0357841 | A1 | 12/2018 | McQuade |
| 2019/0016341 | A1 | 1/2019 | Nelson |
| 2019/0138021 | A1 | 5/2019 | Merzig |
| 2019/0236863 | A1 | 8/2019 | Kwak |
| 2019/0339692 | A1 | 11/2019 | Sakai et al. |
| 2019/0383627 | A1 | 12/2019 | Nangeroni et al. |
| 2020/0104790 | A1 | 4/2020 | Chung |
| 2020/0125117 | A1* | 4/2020 | Switkes ............ H04W 4/029 |
| 2020/0156630 | A1 | 5/2020 | Schmidt et al. |
| 2020/0294401 | A1 | 9/2020 | Kerecsen |
| 2020/0317184 | A1* | 10/2020 | Ali Khan ........... B60W 10/198 |
| 2021/0031782 | A1 | 2/2021 | Poulin et al. |
| 2021/0387629 | A1 | 12/2021 | Lefebvre |
| 2023/0014274 | A1* | 1/2023 | Manita ............. B60W 10/04 |
| 2023/0249684 | A1 | 8/2023 | Poulin et al. |

FOREIGN PATENT DOCUMENTS

| | | | |
|---|---|---|---|
| DE | 19907372 | | 7/2000 |
| JP | 60163735 A * | 8/1985 | ............ B60K 31/10 |
| JP | 5018291 B2 * | 9/2012 | |
| KR | 20150047213 A * | 5/2015 | .......... B60W 30/143 |
| WO | 2006015425 A1 | 2/2006 | |
| WO | WO-2012117419 A2 * | 9/2012 | ........... B60K 31/042 |
| WO | 2019043446 A1 | 3/2019 | |

OTHER PUBLICATIONS

Application-specific integrated circuit—Wikipedia (Year: 2019).*
Machine Translation of WO-2012117419-A2 retreived from Espacenet on Jul. 31, 2023 (Year: 2023).*
Machine Translation of KR 20150047213 A retreived from Espacenet on Jul. 31, 2023 (Year: 2023).*
What Intelligent Speed Limiter UX looks like on a 2017 Range Rover (Year: 2017).*
Machine Translation of JP-5018291-B2 retreived from Espacenet on Apr. 23, 2024 (Year: 2024).*
Transtex "E-Smart" Marketing Flyer. http://transtex-llc.com/wp-content/uploads/2018/06/Transtex-MKTG-Flyer-E-SMART-Combo-Web-20180618.pdf. Published on the Internet by Transtex Jul. 23, 2018, 2 pages.

* cited by examiner

SIMULATING BRAKING WHEN SPEEDING ON CRUISE CONTROL TO FACILITATE USE OF ISA SYSTEM

BACKGROUND OF THE INVENTION

The present invention generally relates to electronic speed management systems for vehicles that are designed to further compliance by drivers with speed limits. The vehicle may be a motor vehicle such as, for example, an automobile, truck, or semi-truck. It is further contemplated that at least some embodiments of the present invention have utilization with not only motor vehicles but also electric vehicles.

Figure 1:
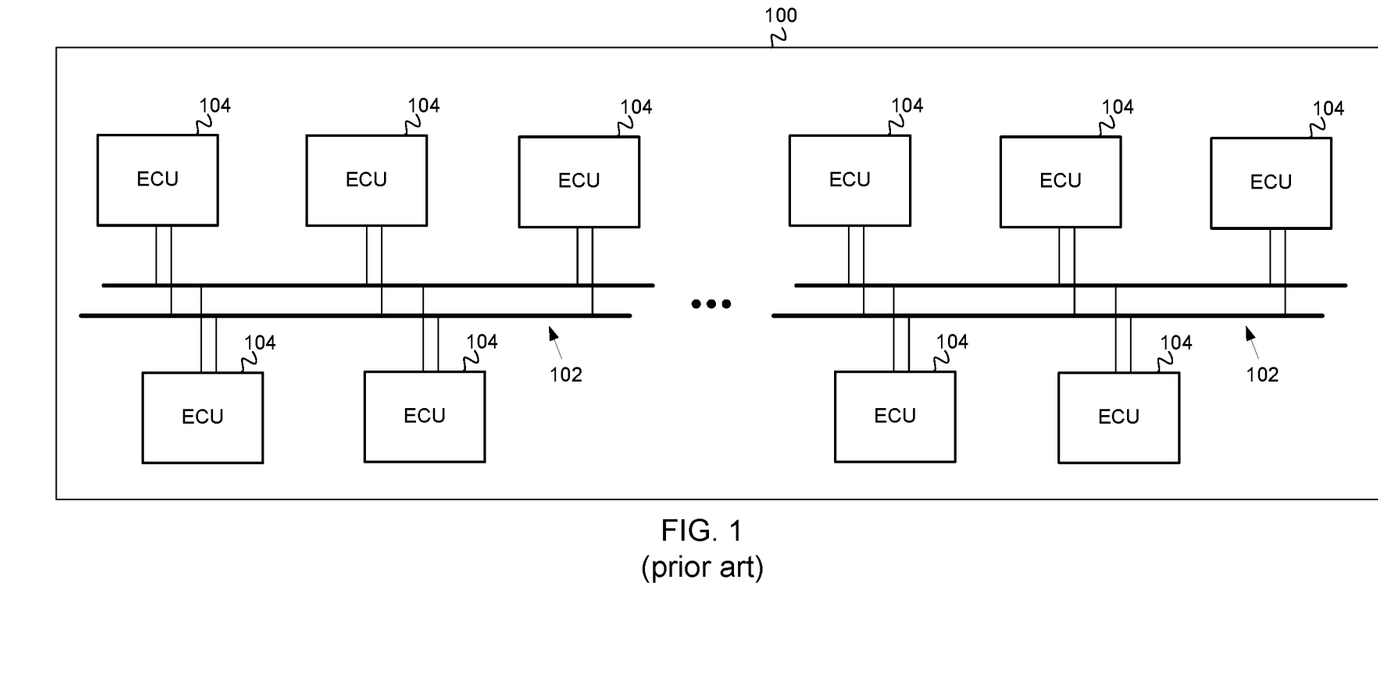
FIG. 1 is a schematic illustration of a prior art electronic network of a motor vehicle.

Within this context, FIG. 1 is a schematic representation of an exemplary electronic network 100 of a motor vehicle. The network 100 preferably is a controller area network (CAN) comprising a data bus 102 and a plurality of electronic control units (ECUs) 104 connected to the data bus for electronic communications between the ECUs.

Each ECU defines a node of the network, and the complexity of the node can range from a simple I/O device to an embedded computer with a CAN interface and sophisticated software. A node also may comprise a gateway enabling other electronic devices to communicate over a port, such as a USB or Ethernet port, to the devices on the CAN network. Such other electronic devices may comprise, for example, wireless communication interfaces, including cellular communications, for wirelessly communicating with servers and other computing devices connected to the Internet. This enables real time communications between one or more nodes of the controller area network of the vehicle and a remotely located computer, such as a server. The data bus 102 connecting the nodes may comprise two wires as schematically seen in FIG. 1 and preferably comprises a twisted pair in actual implementation.

A vehicle commonly has a large number of ECUs connected by the data bus 102. Communications utilizing basic CAN protocols are preferred but other higher level protocols and network technologies are contemplated, including by way of example and not limitation CAN FD, CAN OPEN, OBD2, and SAE J1939, J1708, as well as other communications protocols and technologies whether invented or hereinafter arising. In its broadest scope, the invention is not limited by any specific protocol or network technology, although preferred embodiments preferably are implemented using one or more of the aforementioned technologies. Of the ECUs present in a vehicle, there is generally a powertrain control module (PCM), which traditionally has been referred to as an engine control module (ECM) or engine control unit because such unit controls engine functions such as spark timing, fuel mixture, and emissions. PCM has become a more descriptive term because the PCM on many vehicles also controls the transmission, which is part of the powertrain. In contrast, a transmission control module (TCM) usually is a separate control module responsible for the transmission. The TCM interacts with the PCM/ECM for transmission shifting at appropriate speeds and loads. There also typically is a body control module (BCM)—another major module handling multiple tasks ranging from lighting and other electrical accessories to climate control, keyless entry, anti-theft duties and managing communications between other modules. The functions and specific modules in a vehicle can vary greatly depending on the year, make and model of vehicle, and even its list of options. As used herein a generic reference to a "main control module" or MCM refers to that module in a vehicle which is responsible for and controls engine operations based on communications and can be used to control acceleration or speed of the vehicle. The MCM commonly will be the PCM or ECM.

Other ECUs include: ABS/traction control/stability control modules; airbag (SRS) modules; alarm modules (or chime modules) for anti-theft system; cruise control modules; electronic steering modules; fuel pump control modules; injector driver modules; instrument cluster control modules; keyless entry modules; lighting modules; remote start/immobilizer modules; suspension control modules; transfer case modules for four-wheel drives; wiper motor control modules; and vehicle communication modules. There also can be modules for power windows, power seats, heated/cooled seats, power sliding doors, door locks, sunroofs, and air flow control doors inside the heating ventilation air conditioning (HVAC) system. These are only representative, and many more types of modules exist. Generally speaking, controllers, sensors and actuators typically are or form part of the types of devices connected by a controller area network 100. Indeed, it is contemplated that a node of a controller area network may comprise a subsystem of devices each having one or more electronic or electromechanical components, that a node may consist of a single such component, or any combination thereof.

Additionally, many vehicles now have advanced driver assistance (ADA) systems, which may be OEM or after market. Some ADA systems manage braking, such as collision mitigation systems, and others manage speed. Those that manage speed often are referred to as intelligent speed adaptor (ISA) systems—or sometimes as intelligent speed adaptation systems or intelligent speed assistance systems. ISA systems are in-vehicle systems that commonly are intended and used to increase speed-limit compliance by drivers.

There are three general categories of ISA systems: open ISA systems; half-open ISA systems; and closed ISA systems. Open ISA systems provide an alert (visible and/or audible) to a driver when a speed limit is exceed and rely upon the driver to decrease the vehicle's speed; half-open ISA systems provide an alert and also temporarily limit the vehicle's capability to exceed the speed limit or make it more difficult to exceed the speed limit by the driver, such as by increasing the force countering depression of an accelerator pedal by a driver; and closed ISA systems limit the speed automatically, overriding a driver's actions causing the speeding, such as by controlling fuel delivery, or by altering acceleration control signals that are sent from an acceleration pedal to an electronic throttle controller and/or to the ECM.

Basic ISA systems limit speed of a vehicle to a preset maximum speed independent of extraneous factors including location of the vehicle. The more advanced ISA systems use information regarding location of the vehicle and a speed limit in force at such location in limiting the vehicle's speed to the then current speed limit. Advanced ISA systems may identify dynamic speed limits and limit a vehicle's speed to the then current speed limit for a given time at a given location. Dynamic speed limits may change based on time-dependent factors such as traffic flow and weather conditions. Information can be obtained in advanced ISA systems through use of digital maps incorporating roadway coordinates as well as from databases containing speed limits for road segments in a geographical area, or through other technologies such as optical recognition technology that detects and interprets roadside speed limit signage. Advanced ISA systems thus assists a driver in keeping to the lawful speed limits at all times, particularly as the vehicle travels through different speed zones. This is particularly useful when drivers are in unfamiliar areas or when they pass through areas where dynamic speed limits are in use. GPS-based ISA systems are believed to be perhaps the most effective ISA systems. In such a system, a GPS device detects a vehicle's current location which information is then used to determine the applicable speed limit from, for example, a preloaded database.

Figure 2:
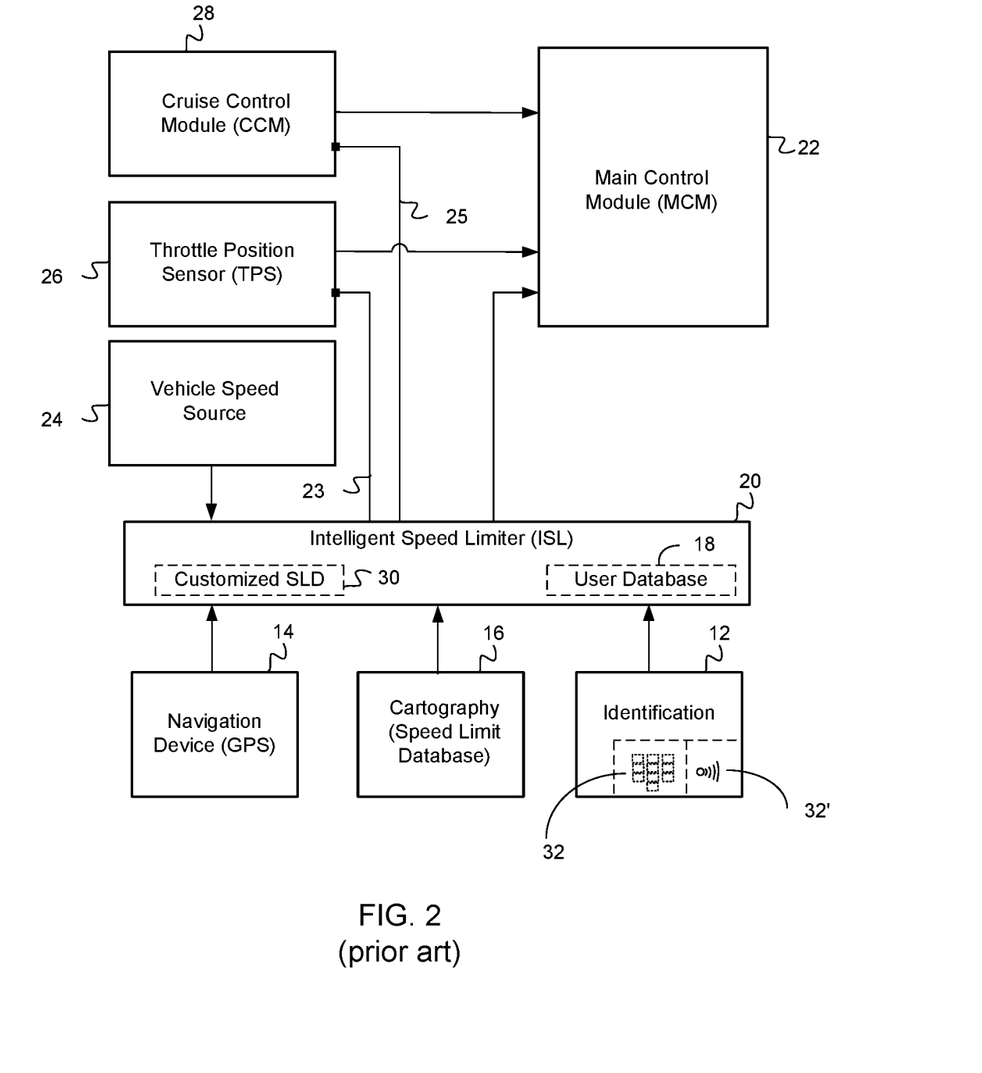
FIG. 2 is a schematic illustration of an embodiment of a prior art ISA system in accordance with the disclosure of the '133 Patent.

A particular ISA system for limiting the maximum speed of a motor vehicle is disclosed in U.S. Pat. No. 8,751,133 to Poulin, the disclosure of which is incorporated herein by reference. An embodiment in accordance with the disclosure of the '133 Patent is illustrated in FIG. 2. In this embodiment, an actual throttle sensor signal from the throttle position sensor to the engine control unit is modified by a speed controller or intelligent speed limiter (ISL) 20 in order to prevent the user from driving the vehicle at a speed beyond the actual allowed maximum speed limit. By modifying the throttle sensor signal, when appropriate, the ISL module 20 is able to cause the speed of the vehicle to decrease when the speed limit is exceeded.

With reference to FIG. 2, the ISA system comprises a number of modules defining nodes of the controller area network including: a user identification device 12 for identifying a driver of the vehicle; a navigation device 14, such as a navigation device including global positioning system (GPS) capabilities for determining a position of the vehicle on a road map (map matching); and a speed limit database 16 or cartography database of posted speed limits for respective segments of roads of the map, which database 16 may be updated in real time or provided from an external provider over wireless communications. These components are connected for communications with the ISL module 20, which executes an allowed maximum speed algorithm. The allowed maximum speed algorithm determines in real time an actual allowed maximum speed limit by adding the posted speed limit of the actual road segment, obtained by map matching (matching the GPS data with the speed limit database), to the corresponding user over-speed parameter.

The user identification device 12 includes a data input interface to receive a user identification code from the driver, either via a keypad 32 (user identification and/or password) or a wireless device 32' (RFID—radio frequency identification) worn by the driver, or the like.

The ISL module 20 also preferably has access to a user database 18 typically including, for each user, a respective user over-speed parameter corresponding to each respective road segment, which parameter could be provided for different types of roads or could be dependent on the corresponding posted speed limits, typically provided in the form of a driver speed profile table or the like.

The ISL module 20 further communicates with: a main control module of the vehicle comprising an engine control module 22; a vehicle speed source 24, such as a vehicle speed sensor; and a throttle position sensor (TPS) 26. When the vehicle speed determined from the vehicle speed source 24 is within a predetermined activation range below the actual allowed maximum speed limit, the ISL module 20 modifies the actual throttle sensor signal that is sent from the throttle position sensor 26 to the main control module 22 so as to prevent the driver from driving the vehicle at a speed in excess of the currently allowed speed limit.

Optionally, a customized speed limit database 30, defining additional road(s), road segment(s) or even drivable road network of an entire restricted zone area, or the like, usually not shown nor available in typical cartography databases, could be incorporated into the ISL module 20 via speed limit database 30.

As a security feature, the ISA system preferably prevents the vehicle from being moved by either preventing the starting of the vehicle engine or by preventing the signal of the throttle position sensor 26 from being sent to the engine control unit 22 in the absence of a valid user identification.

It will be apparent to the Ordinary Artisan that in a CAN network, all nodes receive the communications sent and that in the ISA system of FIG. 2, the ISL module 20 and the main control module 22 each form a node of the controller area network of the vehicle. The throttle position sensor 26 and vehicle speed source 24 also constitute nodes. In order to modify the actual throttle sensor signal that is sent from the throttle position sensor 26 to the main control module 22 so as to prevent the driver from driving the vehicle at a speed in excess of the currently allowed speed limit, the ISL module 20 controls the signals sent by the throttle position sensor 26. This is schematically represented by control line 23.

Figure 3:
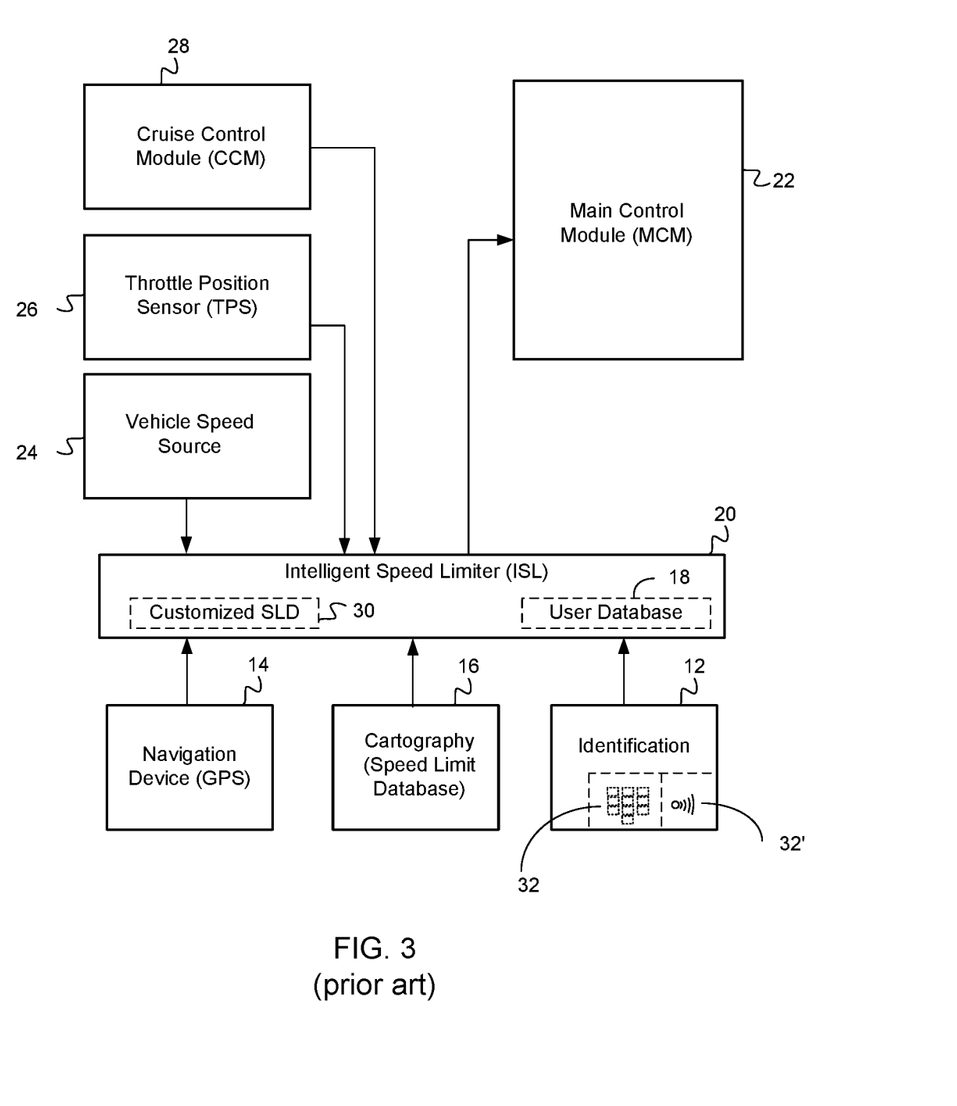
FIG. 3 is a schematic illustration of another embodiment of a prior art ISA system in accordance with the disclosure of the '133 Patent.

An alternative embodiment of the ISA system in accordance with the disclosure of the '133 Patent is illustrated in FIG. 3. In this embodiment, the throttle position sensor module 26 preferably is coupled for communication with the ISL module 20 rather than the CAN bus so that the signals sent from the throttle position sensor 26 are not received by the main control module 22 until after the ISL module 20 has had the opportunity to modify such signals, if necessary, in order to reduce the speed of the vehicle or limit acceleration of the vehicle so as not to exceed the maximum allowed speed.

The aforementioned embodiments of the ISA system of the '133 Patent need to function to prevent speeding regardless of whether cruise control is engaged by a driver; cruise control cannot be permitted to be a workaround for speeding.

Cruise control functionality is provided by a cruise control module 28 that ordinarily would be coupled in communication with the main control module 22 via the CAN bus. FIG. 2 is representative of this arrangement.

In one embodiment, in order for the ISA system to function with the intended effect even when cruise control is engaged, the ISL module 20 takes over control of the cruise control module 28 and allows the setting of the cruise control only at a vehicle speed at or below the actual allowed maximum speed limit and prevents the setting of the cruise control at any vehicle speed above the actual allowed maximum speed limit. This embodiment is represented in FIG. 2, and such control is schematically represented by control line 25 therein.

In FIG. 3, the cruise control module 28 is coupled for communication with the ISL module 20 rather than the CAN bus so that the signals sent from the control module 28 are not received by the main control module 22 until after the ISL module 20 has had the opportunity to modify such signals, if necessary, which is similar to the arrangement of the throttle position sensor module 26. Thus, in both embodiments of FIGS. 2 and 3, a driver is prevented from exceeding the maximum allowed speed using cruise control.

While suitable for its intended purposes, embodiments of the ISA system disclosed in the '133 Patent can be commercially difficult to implement due to the required interactions between the ISL module 20 and the cruise control module 28. In particular, there are many different manufacturers and models of cruise control modules, each module of which can vary significantly in its operation and control.

Each manufacturer and model thus needs to be taken into consideration in either of the implementations of the ISA system of FIGS. 2 and 3.

Accordingly, a need has arisen for improvements in utilization of the ISA system of the '133 Patent—and in other similar ISA systems—which improvements lessen or even obviate the necessity to consider the manufacturer or model of a cruise control module that is utilized in a given vehicle while still enabling the ISA system to properly function when the cruise control is engaged. In other words, there is a need for a ISA system, or enablement of an ISA system, that is cruise control agnostic in its operation. This—and other needs—are believed to be addressed by one or more aspects and features of the present invention.

SUMMARY OF THE INVENTION

The present invention includes many aspects and features. Moreover, while many aspects and features relate to, and are described in the context of, ADA systems and ISA systems in particular, the present invention also has utility outside of such systems, as will become apparent to the Ordinary Artisan from the disclosure herein.

In a first aspect, a vehicle comprises: a controller area network, a node of the controller area network comprising a main control module and another node of the controller area network comprising a cruise control module; and a controller configured to cause an indication to be made to the MCM that a driver of the vehicle is braking even when a driver of the vehicle is not braking. In this aspect, the MCM disengages cruise control upon such indication being made to the MCM.

In a feature, the controller is configured to cause the indication to be made to the MCM that a driver of the vehicle is braking as a function of determining that the vehicle is speeding. The controller indicates to the MCM that a driver of the vehicle is braking preferably as a function of also determining that cruise control is engaged.

In a feature, the controller comprises a microcontroller.

In a feature, the controller comprises an application specific integrated circuit.

In another aspect, a vehicle comprises: a controller area network, a node of the controller area network comprising a main control module (MCM) and another node of the controller area network comprising a cruise control module; a brake switch forming part of a brake switch circuit with the MCM which brake switch, when closed, indicates to the MCM that a driver of the vehicle is braking; and a controller arranged in parallel with the brake switch and configured to bypass the brake switch to simulate the closing of the brake switch thereby indicating to the MCM that a driver of the vehicle is braking even when the brake switch is not closed. The MCM disengages cruise control upon the indication to the MCM that a driver of the vehicle is braking.

In a feature, the controller indicates to the MCM that a driver of the vehicle is braking as a function of determining that the vehicle is speeding. The controller indicates to the MCM that a driver of the vehicle is braking preferably as a function of also determining that cruise control is engaged.

In a feature, the controller comprises a microcontroller.

In a feature, the controller comprises an application specific integrated circuit.

In another aspect, a vehicle comprises: an advanced driver assistance (ADA) system; and means for causing a signal to be received by a main control module (MCM) in a controller area network of the vehicle which signal indicates to the MCM that a driver of the vehicle is braking. The signal is caused by said means to be received by the MCM when the vehicle is determined to be speeding regardless of whether the driver of the vehicle is actually braking.

In a feature, the ADA system comprises an intelligent speed adaptor (ISA) system.

In a feature, the ADA system comprises a collision mitigation system.

In a feature, the vehicle comprises a cruise control module and the ADA system operates without regard to the cruise control module. Preferably, the signal is caused by said means to be received by the MCM when it is determined also that cruise control is engaged.

In another aspect, a method for simulating braking of a vehicle so as to disengage cruise control comprises the steps of: monitoring whether cruise control is engaged; determining a current speed of the vehicle; determining a currently allowed speed of the vehicle; comparing the determined currently allowed speed of the vehicle to the determined current speed of the vehicle; and when cruise control is determined to be engaged and the determined current speed of the vehicle is within a predetermined range of or exceeds the determined currently allowed speed, causing one or more signals to be sent to a main control module of the vehicle simulating braking by a driver of the vehicle causing the main control module to disengage the cruise control.

In another aspect, a method for simulating braking of a vehicle so as to disengage cruise control comprises the steps of: monitoring whether cruise control is engaged; determining a current set speed of the cruise control; determining a currently allowed speed of the vehicle; comparing the determined currently allowed speed of the vehicle to the determined current set speed of the vehicle; and when cruise control is determined to be engaged and the determined current set speed of the cruise control is within a predetermined range of or exceeds the determined currently allowed speed, causing one or more signals to be sent to a main control module of the vehicle simulating braking by a driver of the vehicle causing the main control module to disengage the cruise control.

In another aspect, a method for simulating braking of a vehicle so as to disengage cruise control comprises the steps of determining a current speed of the vehicle; determining a currently allowed speed of the vehicle; comparing the determined currently allowed speed of the vehicle to the determined current speed of the vehicle; and when the determined current speed of the vehicle is within a predetermined range of or exceeds the determined currently allowed speed, causing one or more signals to be sent to a main control module of the vehicle simulating braking by a driver of the vehicle causing the main control module to disengage any cruise control that may be engaged.

In a feature, the currently allowed speed is a speed limit for the vehicle.

In a feature, the currently allowed speed is a fixed speed limit for a current location of the vehicle.

In a feature, the currently allowed speed is a dynamic speed limit for a current location of the vehicle.

In a feature, the currently allowed speed is a predetermined variance from a speed limit for a current location of the vehicle.

In a feature, the currently allowed speed is determined from a database using GPS coordinates of the vehicle.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

Figure 4:
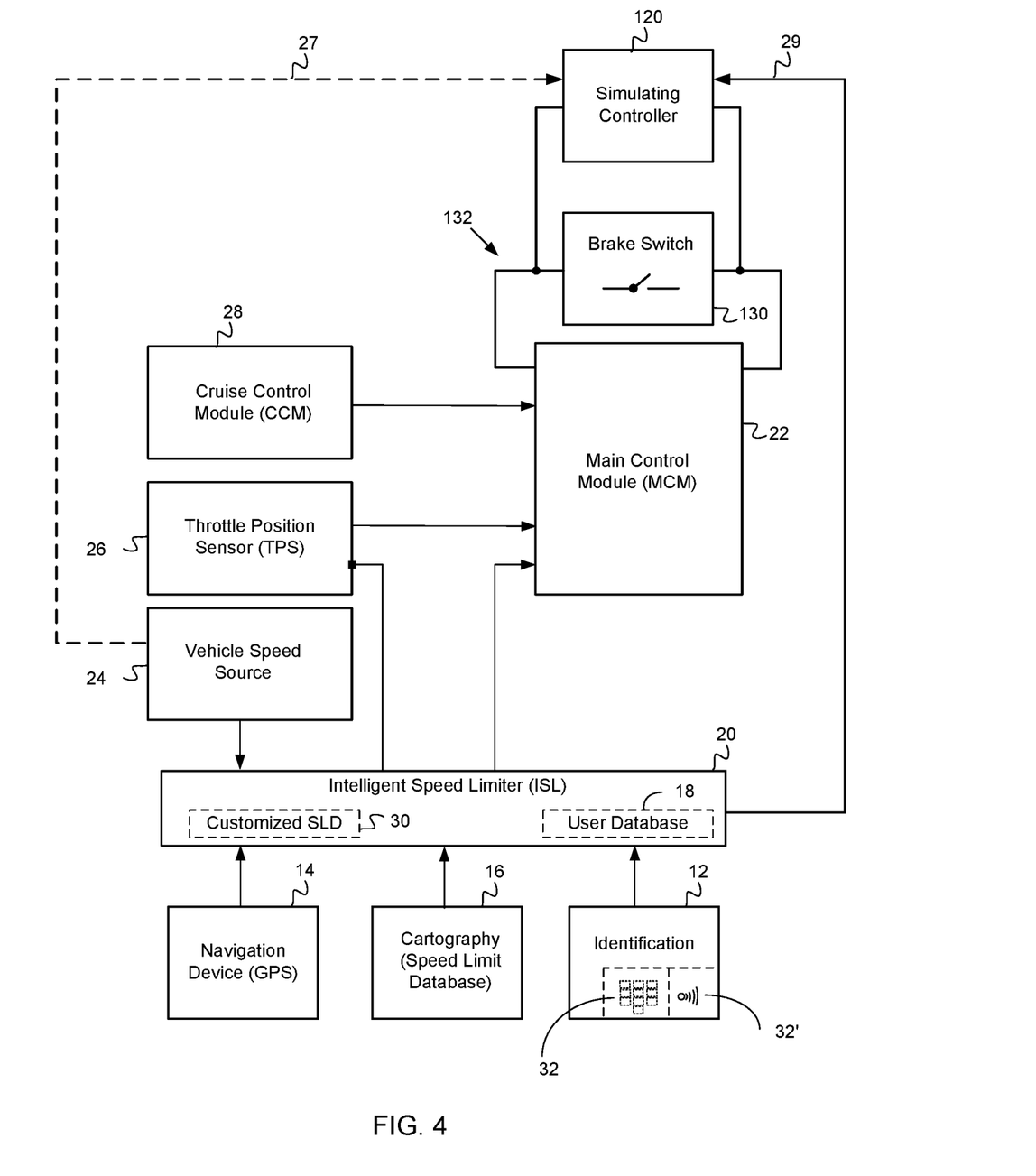
FIG. 4 is a schematic illustration of an embodiment in accordance with one or more aspects and features of the present invention.

FIG. 4 is a schematic illustration of an embodiment in accordance with one or more aspects and features of the present invention. The embodiment of FIG. 4 includes many of the same elements as the ISA system of FIGS. 2 and 3, including an identification device 12 for identifying a driver; a navigation device (e.g. GPS device) 14; a cartography or speed limit database 16; a user database 18 of drivers; an intelligent speed limiter (ISL) module 20; a main control module (MCM) 22; a vehicle speed source 24; a throttle position sensor (TPS) module 26; and a cruise control module 28. A customized speed limit database 30; a keypad 32; and a wireless RFID reader 32' also may be included as shown. Operation of these elements when the cruise control is not engaged may be as described above with regard to the ISA systems of FIGS. 2 and 3.

A difference that will first be noted is that the ISL module 20 in FIG. 4 does not control the cruise control module 28 and the signals that are sent from the cruise control module 28 to the MCM, which is done in the ISA system of FIG. 2. Nor is the cruise control module 28 separately connected to the ISL module 20 like in the ISA system of FIG. 3. Instead, the cruise control module 28 in FIG. 4 is connected to the data bus of the controller area network of the vehicle for communication via the data bus with the main control module 22.

Another difference is the inclusion of a controller or "simulating" controller 120 that mimics or simulates braking by a driver of the vehicle to the main control unit. In particular, the controller 120 may be communicatively coupled to the vehicle speed source 24 via the controller area network whereby a current speed of the vehicle is determined by the controller 120. This is schematically indicated by dashed line 27. Preferably, however, the vehicle speed is obtained by the controller 120 from the ISL module 20, as indicated by line 29. The currently allowed speed limit also preferably is obtained or otherwise determined by the controller 120 from information acquired from the ISL module 20. The controller 120 also monitors the data bus for whether the cruise control module 28 is active and cruise control is currently engaged. In some alternatives, the ISL module determines whether the vehicle is speeding and informs the simulating controller 120. In any case, when the simulating controller 120 determines that the cruise control is engaged and that the current speed of vehicle is within a range of or exceeds the currently allowed speed, the simulating controller 120 causes one or more signals to be sent to MCM 22, which one or more signals indicate to the MCM 22 that the brakes are being applied by the driver, thus simulating driver braking. This mimicking of driver braking results in consequent disengagement by the MCM 22 of the cruise control. Due to the operation of the simulating controller 128, the ISL module 20 is able to operate in a mode corresponding to operation as if there were no cruise control module 28. Nor is the resulting effectiveness of the ISL module 20 impacted by the presence and operation of the cruise control module—a benefit of the embodiment of the present invention for FIG. 4.

Figure 5:
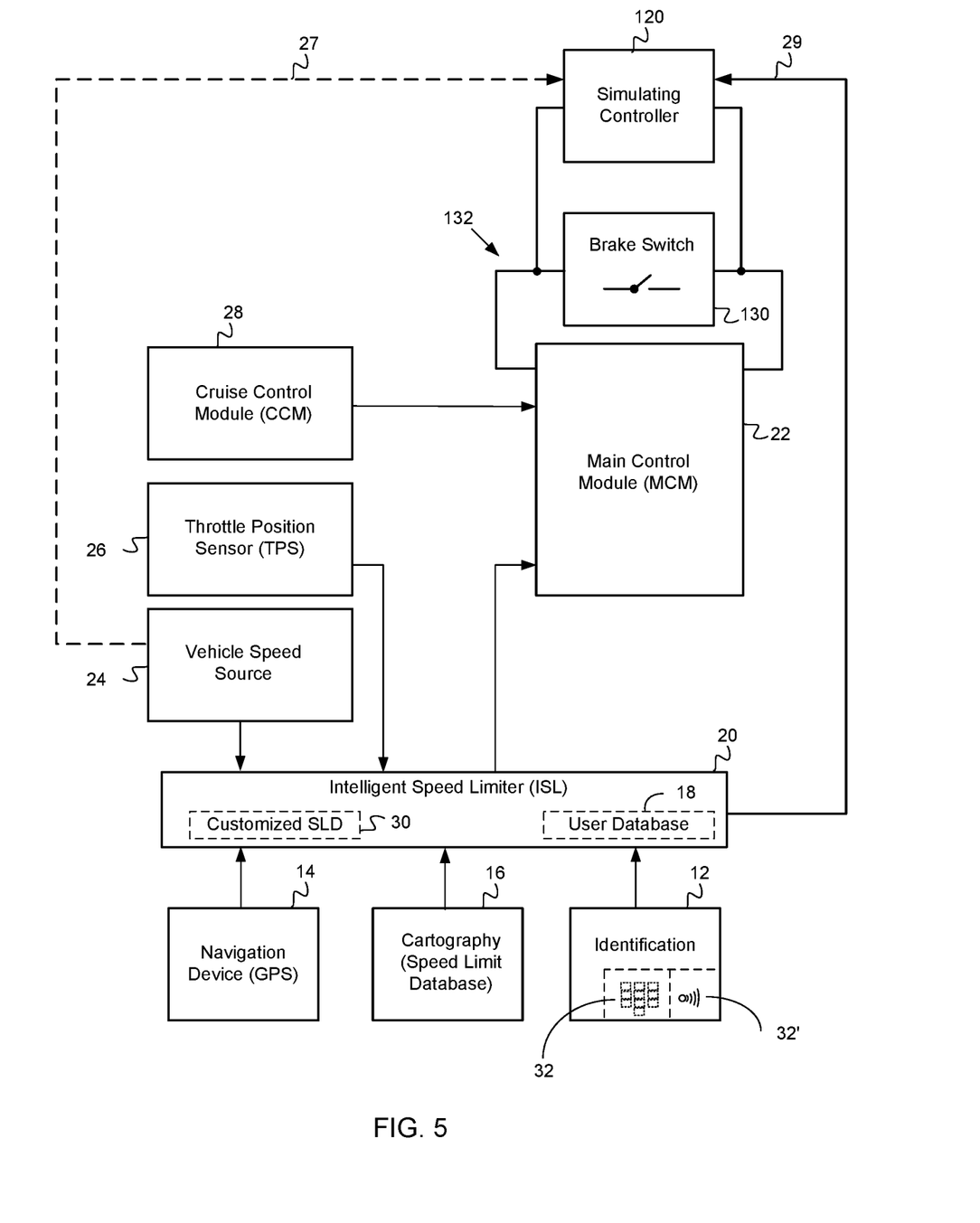
FIG. 5 is a schematic illustration of another embodiment in accordance with one or more aspects and features of the present invention.

FIG. 5 is a schematic illustration of another embodiment in accordance with one or more aspects and features of the present invention. The embodiment of FIG. 5 includes many of same elements as that of FIG. 4 and principally differs in the arrangement of the throttle position sensor 26 relative to the ISL module 20. Specifically, this arrangement of the throttle position sensor 26 and ISL module 20 corresponds to that of FIG. 3. The arrangement of the throttle position sensor 26 and ISL module 20 of FIG. 2 similarly corresponds to that of FIG. 4.

Figure 6:
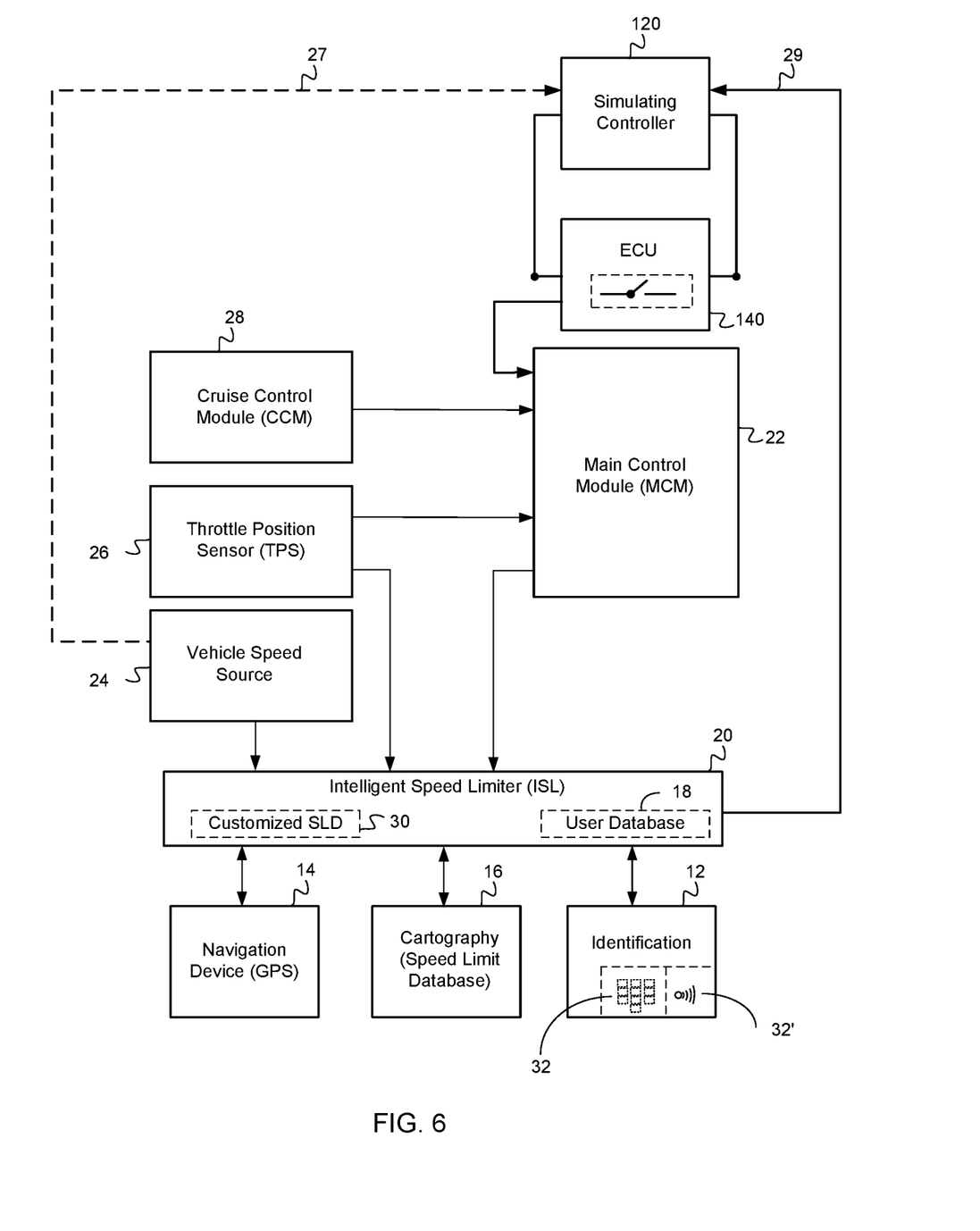
FIG. 6 is a schematic illustration of yet another embodiment in accordance with one or more aspects and features of the present invention.

Continuing on with reference to the arrangement between the throttle position sensor 26 and ISL module 20, the arrangement of FIG. 6 is similar to that of FIG. 5. The embodiment of FIG. 6 in accordance with one or more aspects and features of the present invention differs from that of FIGS. 4 and 5 in how the simulating controller 120 simulates braking by the driver. In particular, in each of the foregoing embodiments described in connection with FIGS. 4-5, the simulating controller preferably bypasses operation of a brake switch of the vehicle. This is done by connecting the simulating controller in parallel with a circuit of brake switch 130 such that the simulating controller 120 closes the brake switch circuit 132 causing a signal to be generated indicating braking even though the brake switch 130 may not be in a closed position so as to complete the circuit 132 itself. The brake switch circuit 132 is connected to the MCM 22 whereby closing of the brake switch circuit 132 signals the MCM 22 that the driver is applying the brakes. Preferably the simulating controller 120 will maintain the closed circuit with current flowing therethrough so long as the simulating controller 120 determines that speeding is occurring. During the simulated braking, the MCM 22 also preferably causes the brake lights to be illuminated, too. In contrast, in the embodiment of FIG. 6 the simulating controller 120 interacts with the brake switch through ECU 140 which itself is communicatively coupled with the MCM 22 via the data bus of the controller area network.

Figure 7:
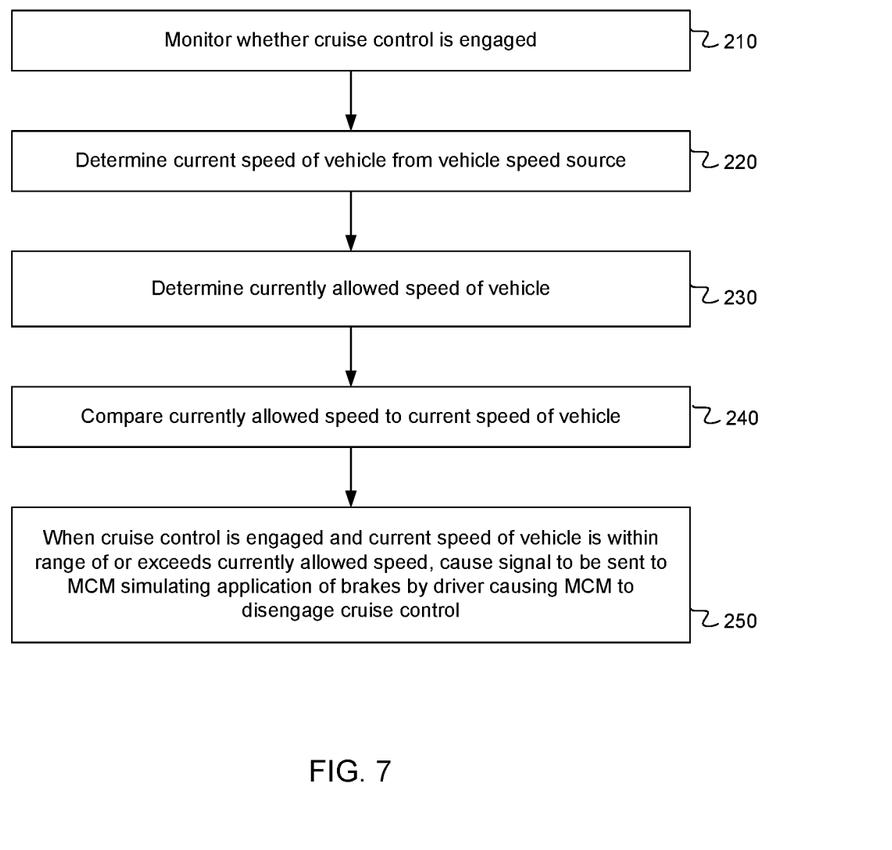
FIG. 7 is a schematic illustration of a sequence of steps that are performed in accordance with one or more aspects and features of the present invention.

A sequence of steps is illustrated in FIG. 7, which steps are representative of an embodiment of a method in accordance with one or more aspects and features of the present invention. In step 210, whether cruise control is engaged is monitored. The step preferably is continuously performed. In step 220, the current speed of the vehicle is determined from the vehicle speed source. This step preferably is performed at short periodic intervals. Similarly, in step 230, the currently allowed speed of the vehicle is determined, which also is performed at short periodic intervals. In step 240, the currently allowed speed of the vehicle is compared to the current speed of vehicle, which step is preferably performed at short periodic intervals. When the cruise control is determined to be engaged and the current speed of the vehicle is determined to be within range of or exceed the determined currently allowed speed, a signal is caused to be sent to the MCM in step 250 that simulates application of the brakes by the driver, thereby resulting in disengagement by the MCM of the cruise control. Of course, as will be understood by the Ordinary Artisan, steps 210,220,230 may be performed in any order or concurrently, and the sequence of steps shown in FIG. 7 is not limiting.

In an alternative embodiment, the simulating controller is able to determine a set speed of the cruise control. This preferably is determined by communication with the MCM via the data bus. It is also contemplated that, while not preferred, this may be accomplished by communicatively coupling the simulating controller to the cruise control module such that a current set speed of the cruise control is thereby determined by the simulating controller. Such connection may be accomplished via the data bus. In either scenario, when the simulating controller determines that the cruise control is engaged and that the current cruise control set speed of vehicle is within a range of or exceeds the currently allowed speed, the simulating controller causes one or more signals to be sent to MCM which signals indicate to the MCM that the brakes are being applied by the driver, thereby simulating driver braking. Again, such mimicking of driver braking results in disengagement by the MCM of cruise control.

Figure 8:
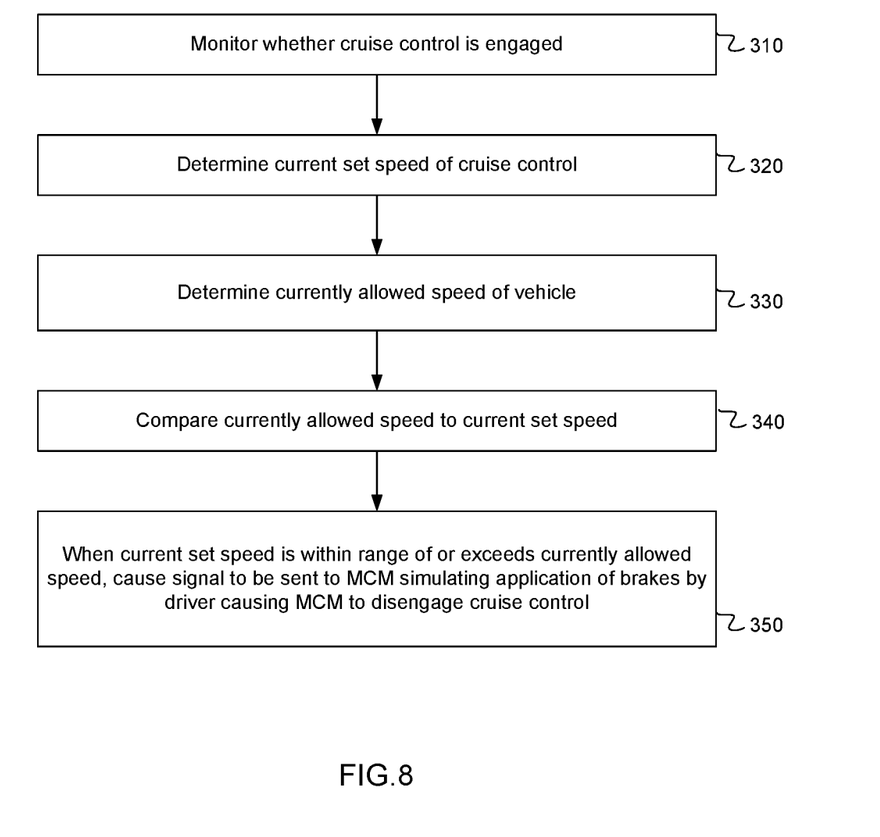
FIG. 8 is a schematic illustration of another sequence of steps that are performed in accordance with one or more aspects and features of the present invention.

Such sequence of steps in this alternative embodiment is illustrated in FIG. 8. Specifically, in step 310, whether cruise control is engaged is monitored. This step preferably is continuously performed. In step 320, the current set speed of the cruise control for the vehicle is determined whether or not the cruise control is engaged. This step preferably is performed at short periodic intervals. Similarly, in step 330, the currently allowed speed of the vehicle is determined, which also is performed at short periodic intervals. In step 340, the currently allowed speed of the vehicle is compared to the current set speed, which step is preferably performed at short periodic intervals. When the cruise control is determined to be engaged and the current set speed of the cruise control is determined to be within range of or exceeds the determined currently allowed speed, a signal is caused to be sent to the MCM in step 350 that simulates application of the brakes by the driver, thereby resulting in disengagement by the MCM of the cruise control. This sequence of steps is believed to be preferential over the sequence of steps of FIG. 7 because there is no ambiguity whether the speeding is momentary due to the vehicle being on a downhill slope as opposed to being set at a speed that is over the currently allowed speed. Of course, as will be understood by the Ordinary Artisan, steps 310,320,330 may be performed in any order or concurrently, and the sequence of steps shown in FIG. 8 is not limiting.

In yet another alternative embodiment, the simulating controller is not communicatively coupled to the cruise control module and does not monitor whether the cruise control is actually engaged. In contrast, in the previously discussed embodiments the simulation of braking is performed only when cruise control is determined to be engaged. In this particular embodiment, however, the simulation of braking is not dependent on determination that cruise control is engaged. Instead, the simulating controller simply determines at short periodic intervals whether the current speed of the vehicle is within a range of or exceeds the currently allowed speed, and the simulating controller causes one or more signals to be sent to MCM which one or more signals indicate to the MCM that the brakes are being applied by the driver, thereby simulating driver braking. This mimicking of driver braking results in disengagement by the MCM of cruise control—if engaged. Moreover, such simulated braking also results in brake override, wherein conflicting signals being received by the MCM from the throttle position sensor are ignored by the MCM resulting in a decrease of or loss of acceleration in vehicle speed and consequent slowing of the vehicle until the detected speeding is abated. This would be similar to a driver depressing simultaneously the brake pedal and the accelerator pedal which, at least in some instances, cause the MCM to respond to the signals resulting from depression of the brake pedal while ignoring the signals resulting from the depression of the accelerator pedal.

Figure 9:
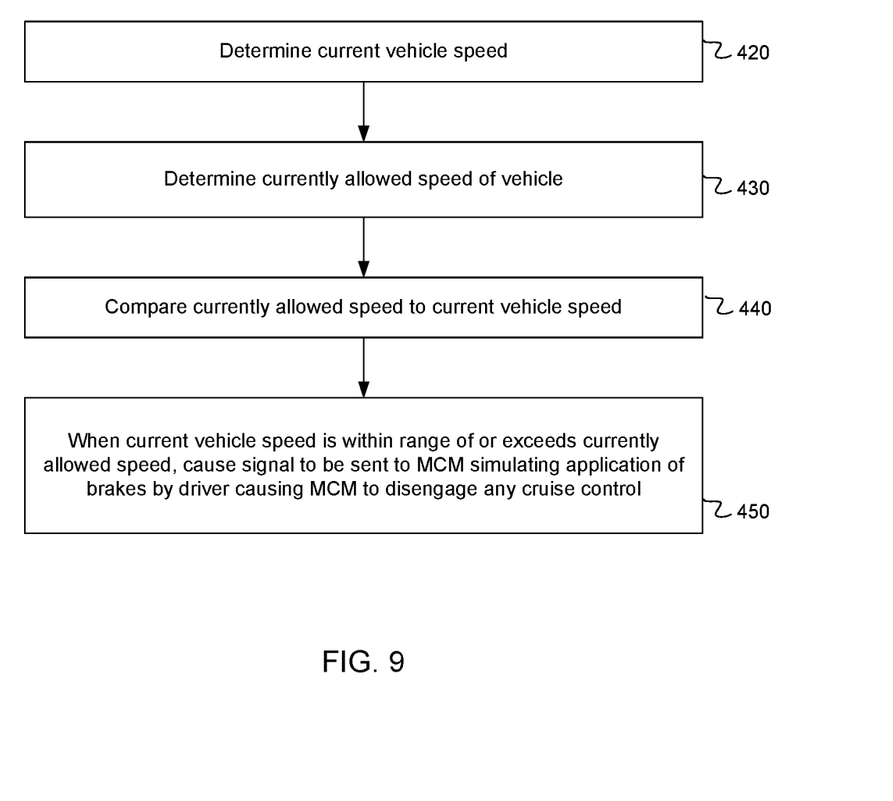
FIG. 9 is a schematic illustration of yet another sequence of steps that are performed in accordance with one or more aspects and features of the present invention.

Such sequence of steps is illustrated in FIG. 9. Specifically, in step 420, the current vehicle speed is determined irrespective of whether the cruise control is engaged. This step preferably is performed at short periodic intervals. Similarly, in step 430, the currently allowed speed of the vehicle is determined irrespective of whether the cruise control is engaged, which also is performed at short periodic intervals. In step 440, the currently allowed speed of the vehicle is compared to the current vehicle speed irrespective of whether the cruise control is engaged, which step is preferably performed at short periodic intervals. When the current vehicle speed is determined to be within range of or exceeds the determined currently allowed speed, a signal is caused to be sent to the MCM in step 450 that simulates application of the brakes by the driver irrespective of whether the cruise control is engaged; however, if cruise control is engaged, then such simulated braking results in disengagement of the cruise control. Of course, as will be understood by the Ordinary Artisan, steps 420, 430 may be performed in any order or concurrently, and the sequence of steps shown in FIG. 9 is not limiting. Additionally, it will be appreciated that if the simulating controller is preprogrammed with one or more allowed speeds, or otherwise is able to determine an allowed speed (such as in the same or a similar way as the ISL module described with reference to FIGS. 2 and 3), then the operation of the simulating controller in accordance with FIG. 9 may result in limiting of the speed of the vehicle when used without and independent of the ISL module.

In the foregoing embodiment in which the set speed of the cruise control is not determined by the simulating controller, the simulating controller does not cause one or more signals to be sent to MCM simulating braking until after a predetermined period of time in which such determinations indicating speeding are made. Alternatively, the simulating controller does not cause one or more signals to be sent to MCM simulating braking until after a predetermined distance has been traveled, during which travel the determinations made by the simulating controller indicate speeding. Such time or distance buffer will avoid disengagement of the cruise control too quickly, which could annoy a driver. For example, a time or distance buffer is usefully used to prevent disengaging the cruise control during a short period of time or over a short distance that the vehicle is traveling downhill. Accordingly, minor speeding transgressions on a limited basis preferably will not result in disengagement of cruise control. On the other hand, a significant magnitude in a transgression regardless of a time or distance buffer preferably will result in disengagement of cruise control. Such a magnitude of speeding would be something that is not the result of simply traveling downhill or something that would legally be deemed reckless driving. For example, speeding by more than 50 km/hr in Canada—or 15 m/hr in the United States—of the currently allowed speed may be deemed to be such a magnitude of transgression so as to ignore any otherwise applicable time or distance buffer.

From the foregoing, it will be appreciated that embodiments of the present invention provide many benefits and advantages. One such advantage is that one or more embodiments of the present invention work well and are compatible with other ADA systems, including other ISA systems and including collision mitigation systems and lane departure systems, for example. Indeed, many embodiments of the present invention do not try to override such other systems and will act only if the vehicle is exceeding the configured speed limit while cruise control is engaged.

Also, this method of disengaging the cruise control avoids directly sending a message on the data bus to the MCM/ECM to disengage the cruise control. Sending messages on the data bus, as opposed to only reading messages from the data bus, is disfavored by OEMs and systems that only read message are favored. In many embodiments of the present invention, the simulating controller only reads data from the data bus and thus would be a favored system by such OEMs. The advantage of using the brake switch method to disengage the cruise control is that the simulating controller only need to cause current to flow through the brake switch circuit, thereby causing the MCM to disengage the cruise control without the simulating circuit signaling the MCM itself via the data bus.

Nonetheless, in less preferred embodiments, it is still contemplated that the simulating controller does communicate with the MCM/ECM, sending commands directly to the MCM/ECM to disengage the cruise control, but requires an understanding of the protocol of each different vehicle model. Also sending a wrong signal to the MCM/ECM can have undesired consequences, such as creating an engine code. Going through the brake switch circuit is therefore believed to be both safer for the MCM/ECM and more universal in commercial applications.

Another benefit is that by avoiding taking over control of the cruise control (as in a disclosed ISA system of the '133 Patent), difficulties can be avoided where other ADA systems that work with the OEM cruise control, such as adaptive cruise control, would likely no longer work and would be overridden. Such incompatibility with other ADA systems is believed to be a serious hinderance to adoption and commercialization of such ISA system of the '133 Patent.

In view of the foregoing, it thus will be appreciated by the Ordinary Artisan that the cruise control can be disengaged by simply simulating a brake switch signal. Simulating the brake switch signal will automatically disengage any cruise control and allow ISA systems and other ADA systems to continue properly functioning should the driver try to bypass such systems through the cruise control, while not having to program or otherwise account for different cruise control systems. By simply simulating the brake switch signal, the cruise control is disengaged when the vehicle goes above the configured speed limit while continuing to limit the accelerator pedal.

Embodiments of the present invention have been reduced to practice. In this regard, FIG. 10 of U.S. patent application publication 2021/0031765, which is the publication of Ser. No. 16/947,456 (the current application; hereinafter the '765 Publication"), and which is incorporated herein by reference, shows a modification to a brake switch that has been installed on a Volvo tractor in accordance with one or more aspects and features of an embodiment of the present invention. FIG. 11 of the '765 Publication shows an alternative modification that has been installed on a Freightliner New Cascadia truck in accordance with one or more aspects and features of an embodiment of the present invention. In particular, in vehicles such as the Freightliner New Cascadia truck, a simulating controller cannot be connected directly to a brake switch and, in those situations, a simulating controller is connected to an ECU with which the brake switch is connected whereby the simulating controller still is able to cause a signal to be generated indicating braking by a driver to the MCM. An exemplary ECU is a surrogate safety assessment model (SSAM) of the Freightliner New Cascadia.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Thus, for example, while the simulating controller has been described in connection with embodiments of an ISA system of the '133 Patent, it will be appreciated that embodiments of the present invention are not limited to use with or incorporate of such an ISA system.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A vehicle comprising:
    (a) a controller area network (CAN) comprising a data bus and a plurality of nodes comprising electronic control units (ECUs) connected to the data bus for electronic communications, the plurality of nodes comprising,
        (i) a main control module (MCM) that receives a plurality of input signals, wherein the MCM controls engine operations comprising acceleration based on the electronic communications;
        (ii) a cruise control module that communicates with the MCM for controlling a speed of the vehicle when the cruise control module is engaged; and
        (iii) an intelligent speed limiter (ISL) module of a closed intelligent speed adaptor (ISA) system, wherein the ISL module that communicates, to the MCM, a signal corresponding to depression of an accelerator pedal of the vehicle for controlling acceleration of the vehicle by the MCM;
    (b) a throttle position sensor module that provides a signal, corresponding to depression of an accelerator pedal of the vehicle, directly to the ISL module for communication to the MCM, wherein the ISL module modifies the signal for limiting the speed of the vehicle when the speed of the vehicle is determined by the ISL module to be within a range of or exceeding an allowed speed;
    (c) a brake switch connected to the MCM, wherein the brake switch provides one or more signals to the MCM indicative of vehicle braking which results in disengaging the cruise control when the cruise control is engaged; and
    (d) a simulating controller connected in parallel to the brake switch and to the MCM, wherein the simulating controller provides one or more signals to the MCM indicating vehicle braking for disengaging the cruise control when
        (A) the speed of the vehicle is determined to be within a range of or exceeding an allowed speed, and (B) if the cruise control is determined to be engaged, such that the effectiveness of the ISA system to limit the speed of the vehicle to an allowed speed by controlling acceleration of the vehicle by the MCM is unaffected by the cruise control module.

2. The vehicle of claim 1, wherein the simulating controller is connected to an ECU to which the brake switch also is connected and which ECU communicates indications of vehicle braking to the MCM.

3. The vehicle of claim 1, wherein the simulating controller is communicatively coupled to a vehicle speed source for determining a current speed of the vehicle and obtains an allowed speed limit of the vehicle from the ISL module; and wherein the simulating controller determines when the current speed of the vehicle is within a range of or exceeding an allowed speed limit of the vehicle.

4. The vehicle of claim 1, wherein the simulating controller obtains both a current speed of the vehicle and an allowed speed limit of the vehicle from the ISL module; and wherein the simulating controller determines when the current speed of the vehicle is within a range of or exceeding an allowed speed limit of the vehicle.

5. The vehicle of claim 1, wherein the simulating controller receives communications over the CAN for determining when the cruise control is engaged and for determining a set speed of the cruise control; and wherein the simulating controller is provides one or more signals to the MCM indicating vehicle braking for disengaging the cruise control when both
(A) a set speed of the cruise control is determined to be within a range of or exceeding an allowed speed limit of the vehicle, and
(B) the cruise control is determined to be engaged.

6. The vehicle of claim 1, wherein the MCM causes illumination of brake lights of the vehicle when receiving one or more signals indicative of vehicle braking.

7. The vehicle of claim 1, wherein the ISL module determines when the current speed of the vehicle is within a range of or exceeding an allowed speed limit, which determination is communicated to the simulating controller.

8. The vehicle of claim 1, wherein the simulating controller provides the one or more signals only after a predetermined amount of time transpires during which the speed of the vehicle is determined to be within a range of or exceeding an allowed speed.

9. The vehicle of claim 1, wherein the simulating controller provides the one or more signals only after a predetermined distance of travel transpires during which the speed of the vehicle is determined to be within a range of or exceeding an allowed speed.

10. A vehicle comprising:
(a) a controller area network (CAN) comprising a data bus and a plurality of nodes comprising electronic control units (ECUs) connected to the data bus for electronic communications, the plurality of nodes comprising,
  (i) a main control module (MCM) that receives a plurality of input signals, wherein the MCM controls engine operations comprising acceleration based on the electronic communications;
  (ii) a cruise control module that communicates with the MCM for controlling a speed of the vehicle when the cruise control module is engaged; and
  (iii) an intelligent speed limiter (ISL) module of a closed intelligent speed adaptor (ISA) system;
(b) a throttle position sensor module that communicates, to the MCM, a signal corresponding to depression of an accelerator pedal of the vehicle for controlling acceleration of the vehicle by the MCM, wherein the ISL module is directly connected to the throttle position sensor module and modifies the signal that is communicated by the throttle position sensor module to the MCM for limiting the speed of the vehicle to an allowed speed by controlling acceleration of the vehicle by the MCM;
(c) a brake switch connected to the MCM wherein the brake switch provides one or more signals to the MCM indicative of vehicle braking which results in disengaging the cruise control when the cruise control is engaged; and
(d) a simulating controller connected in parallel to the brake switch and to the MCM, wherein the simulating controller provides one or more signals to the MCM indicating vehicle braking for disengaging the cruise control when
  (A) the speed of the vehicle is determined to be within a range of or exceeding an allowed speed, and
  (B) if the cruise control is determined to be engaged, such that the effectiveness of the ISA system to limit the speed of the vehicle to an allowed speed by controlling acceleration of the vehicle by the MCM is unaffected by the cruise control module.

11. The vehicle of claim 10, wherein the simulating controller is connected to an ECU to which the brake switch also is connected and which ECU communicates indications of vehicle braking to the MCM.

12. The vehicle of claim 10, wherein the simulating controller is communicatively coupled to a vehicle speed source for determining a current speed of the vehicle and obtains an allowed speed limit of the vehicle from the ISL module; and wherein the simulating controller determines when the current speed of the vehicle is within a range of or exceeding an allowed speed limit of the vehicle.

13. The vehicle of claim 10, wherein the simulating controller obtains both a current speed of the vehicle and an allowed speed limit of the vehicle from the ISL module; and wherein the simulating controller determines when the current speed of the vehicle is within a range of or exceeding an allowed speed limit of the vehicle.

14. The vehicle of claim 10, wherein the simulating controller receives communications over the CAN for determining when the cruise control is engaged and for determining a set speed of the cruise control; and wherein the simulating controller provides one or more signals to the MCM indicating vehicle braking for disengaging the cruise control when both
(A) a set speed of the cruise control is determined to be within a range of or exceeding an allowed speed limit of the vehicle, and
(B) the cruise control is determined to be engaged.

15. The vehicle of claim 10, wherein the MCM causes illumination of brake lights of the vehicle when receiving one or more signals indicative of vehicle braking.

16. The vehicle of claim 10, wherein the ISL module determines when the current speed of the vehicle is within a range of or exceeding an allowed speed limit, which determination is communicated to the simulating controller.

17. The vehicle of claim 10, wherein the simulating controller provides the one or more signals to be provided only after a predetermined amount of time transpires during which the speed of the vehicle is determined to be within a range of or exceeding an allowed speed.

18. The vehicle of claim 10, wherein the simulating controller provides the one or more signals only after a predetermined distance of travel transpires during which the speed of the vehicle is determined to be within a range of or exceeding an allowed speed.

* * * * *